United States Patent [19]

Taub

[11] Patent Number: 5,158,187
[45] Date of Patent: Oct. 27, 1992

[54] TRAY OF SHELF-LIKE STRUCTURE

[76] Inventor: Ronald H. Taub, 1154 Sheridan Rd., Highland Park, Ill. 60035

[21] Appl. No.: 670,185

[22] Filed: Mar. 15, 1991

[51] Int. Cl.$^5$ .................................................. A47F 5/00
[52] U.S. Cl. ................................. 211/186; 211/153; 211/188; 108/111
[58] Field of Search ............... 211/133, 186, 194, 188, 211/186, 126, 153; 108/111

[56] References Cited

U.S. PATENT DOCUMENTS

| | | | |
|---|---|---|---|
| 3,065,860 | 11/1962 | Swanson | 211/153 |
| 3,344,756 | 10/1967 | Kelson | 211/135 X |
| 3,964,810 | 6/1976 | Murphy | 211/188 X |
| 4,574,709 | 3/1986 | Lakey et al. | 211/153 X |
| 4,579,233 | 4/1986 | Hepp | 211/133 X |
| 4,940,150 | 7/1990 | Spengler | 211/188 |
| 4,958,739 | 9/1990 | Spamer | 211/153 |
| 5,018,628 | 5/1991 | Schenck | 211/153 |

Primary Examiner—Robert W. Gibson, Jr.
Attorney, Agent, or Firm—Michael G. Berkman

[57] ABSTRACT

A two-component shelf-like or tray assembly of two end-joined interlocking panels each fabricated of molded plastics compositions. Abutting, inter-joinable end walls of the panels are of reciprocal structural configurations, making it possible to use a single mold in fabricating the panels themselves. The panels are pivotally interengageable and manually manipulable to lock and to assume a continuous, lineally extended, expanse constituting a stable, composite, unitary structure having a generally flat or planar support surface. Integrally formed auxiliary structures permit arrangement of a plurality of panel assemblies as a tiered, vertical array. Panels either of the same or of dissimilar longitudinal dimensions may be combined to provide shelves of selectable overall length. Molds with removable sections, in length and width, provide enhanced versatility, permitting one to mold various size components or to use a selectable number of sections with reciprocal interlock producing mold components to provide panels of varying sizes. Novel adapters or fixtures for use in the tiered array of shelves enable one to provide one or more shelves which are in a slanted or pitched mode or attitude.

45 Claims, 6 Drawing Sheets

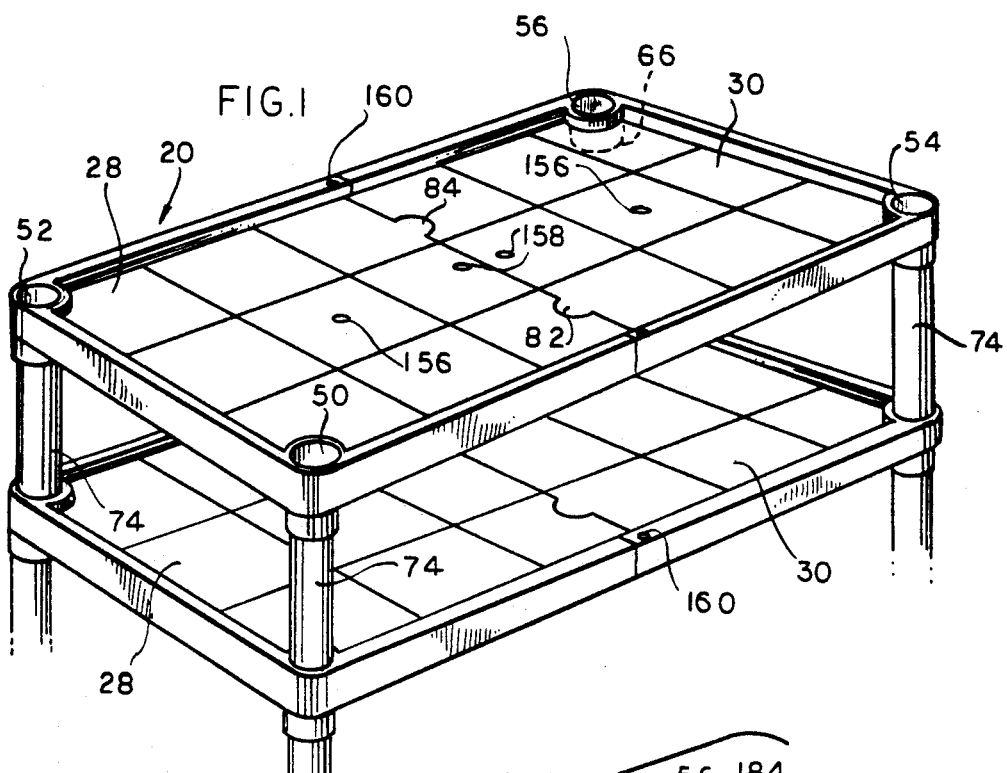
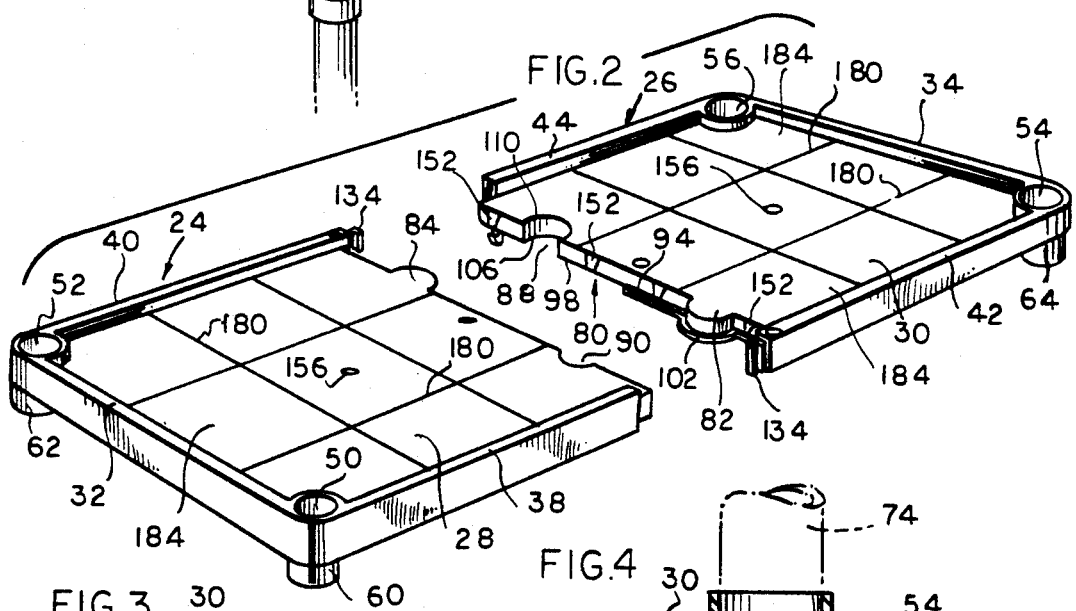
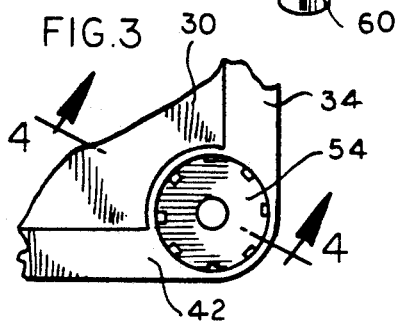
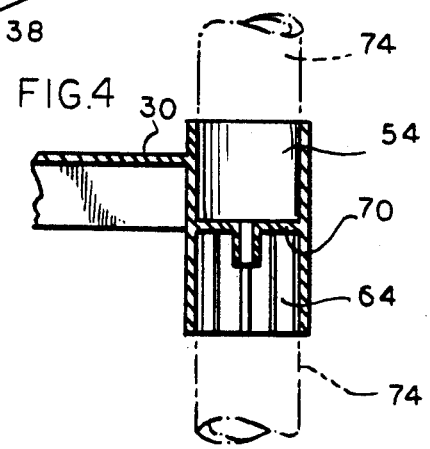

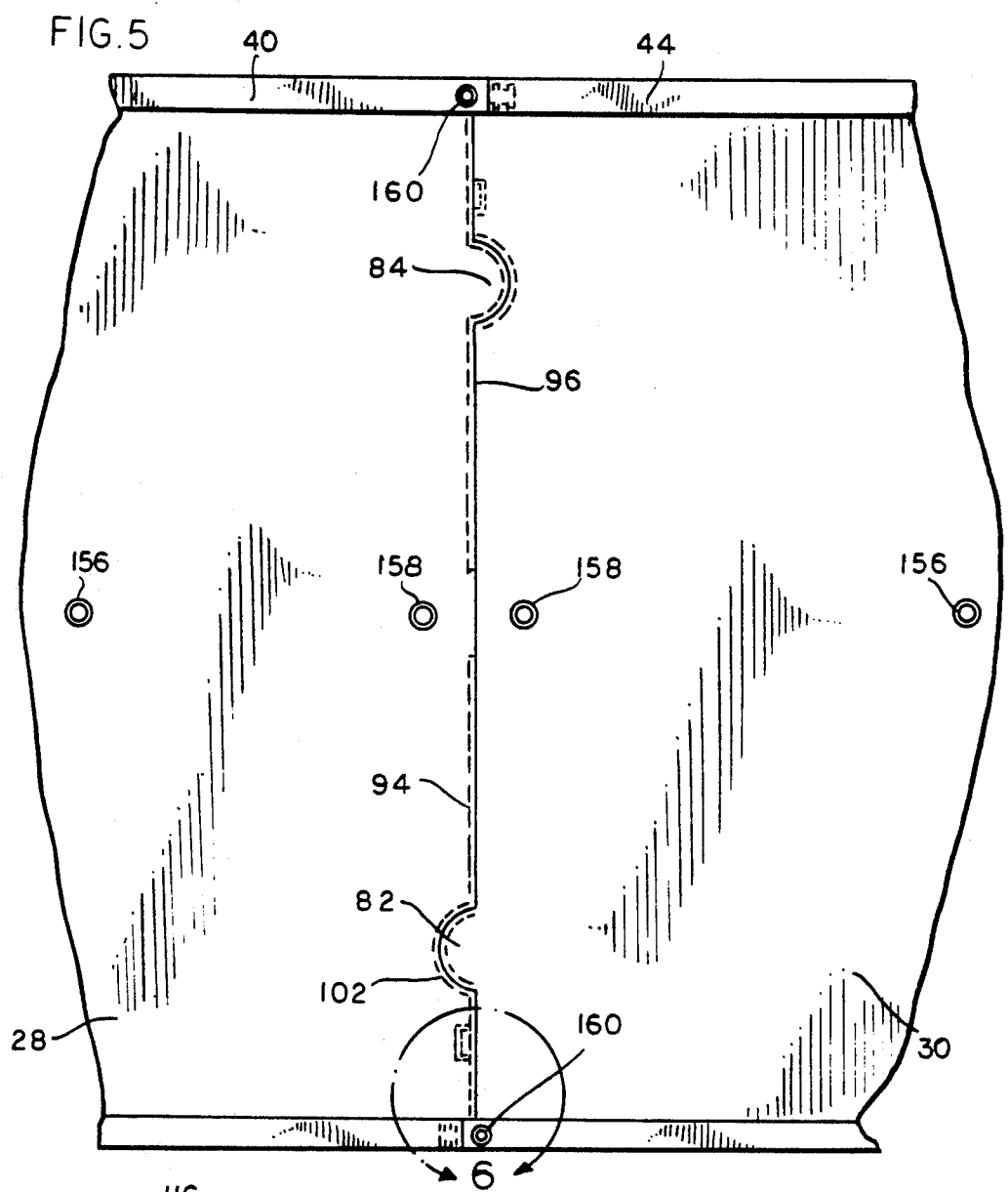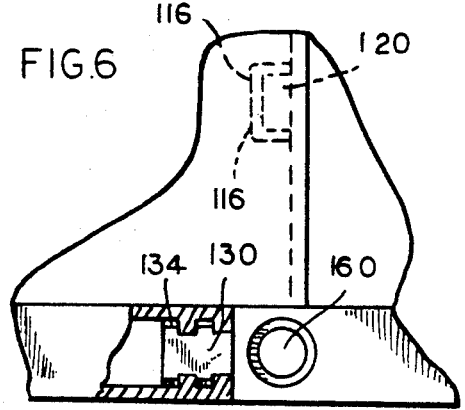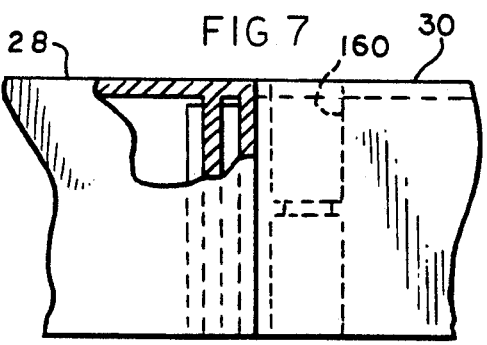

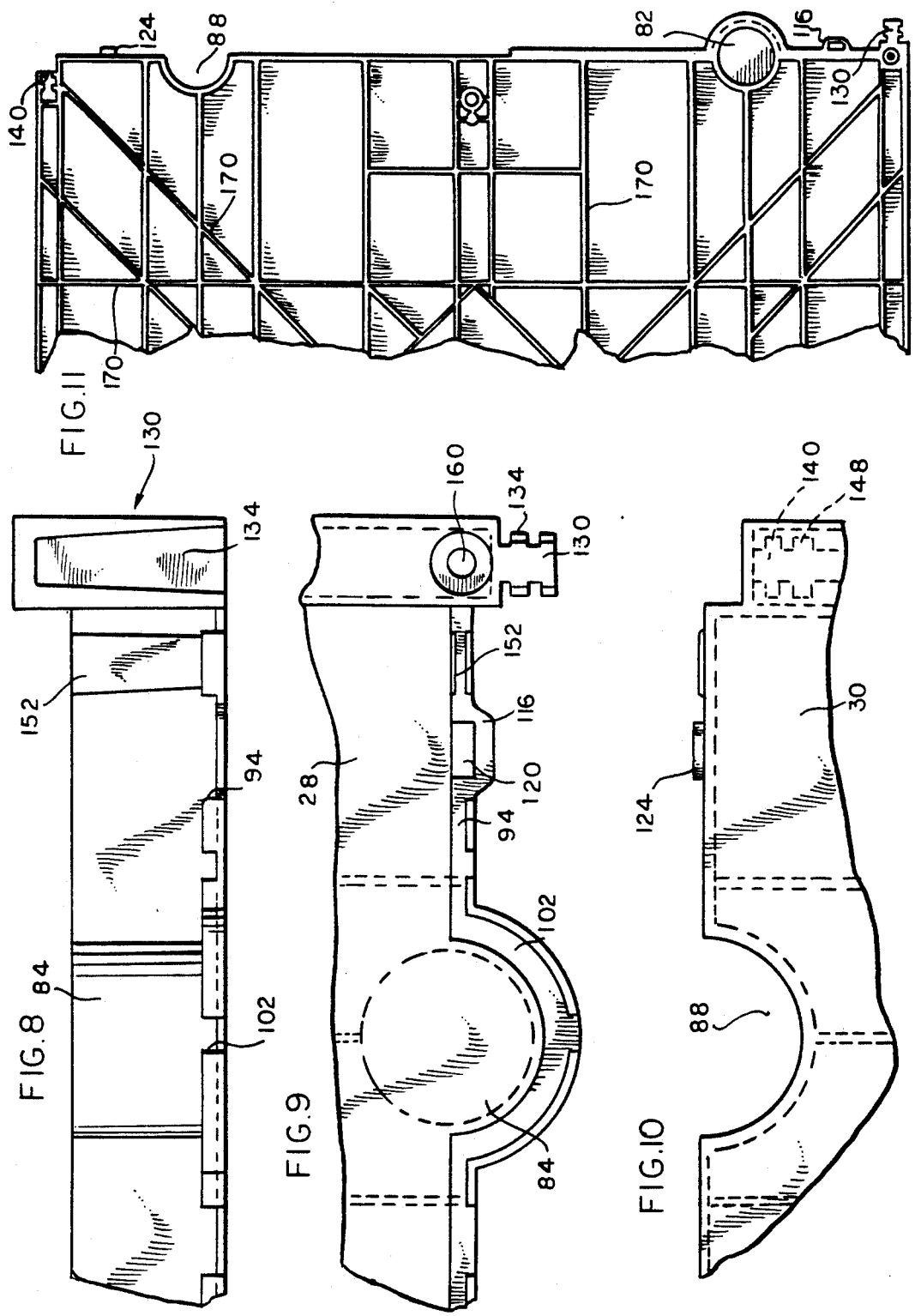

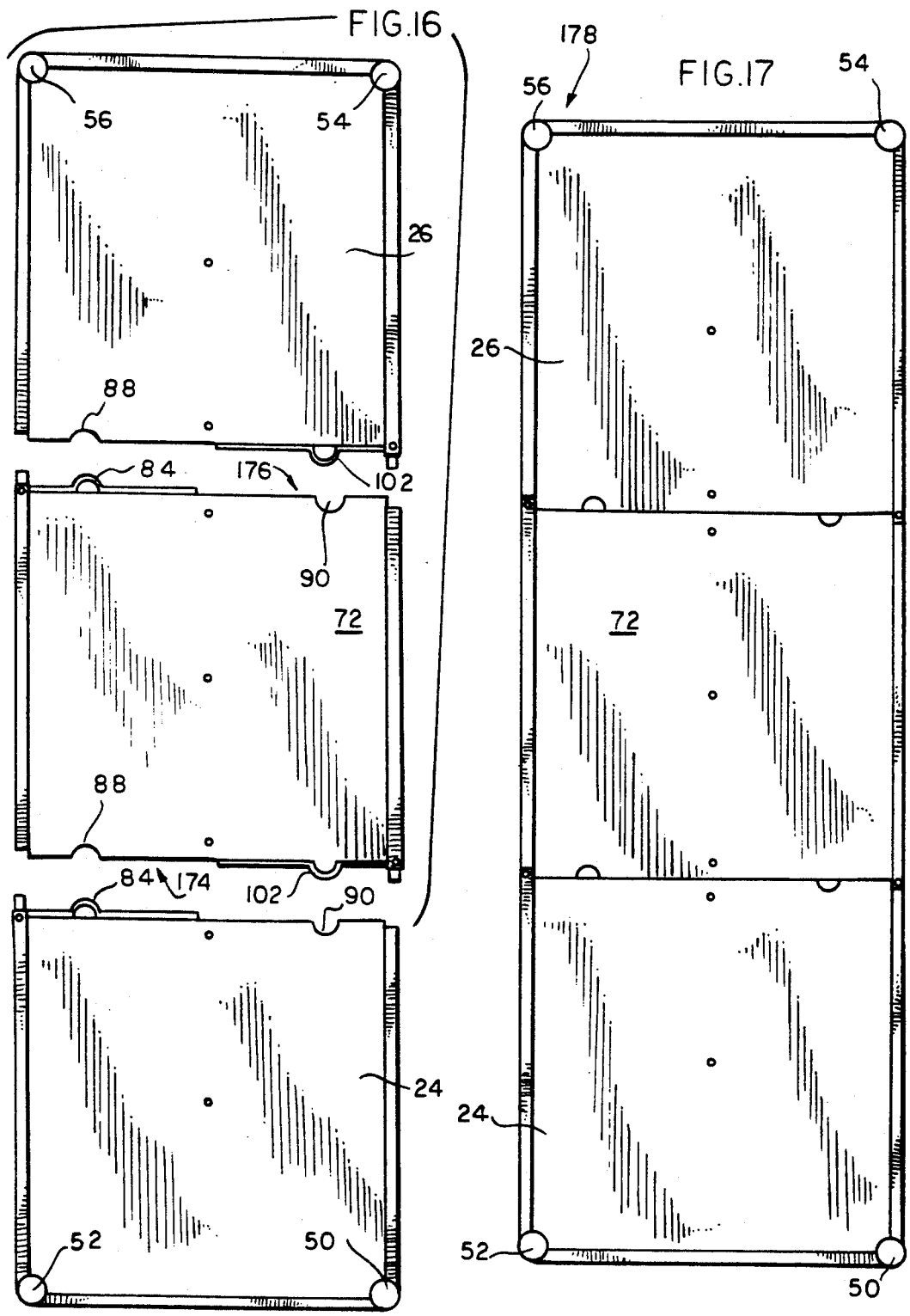

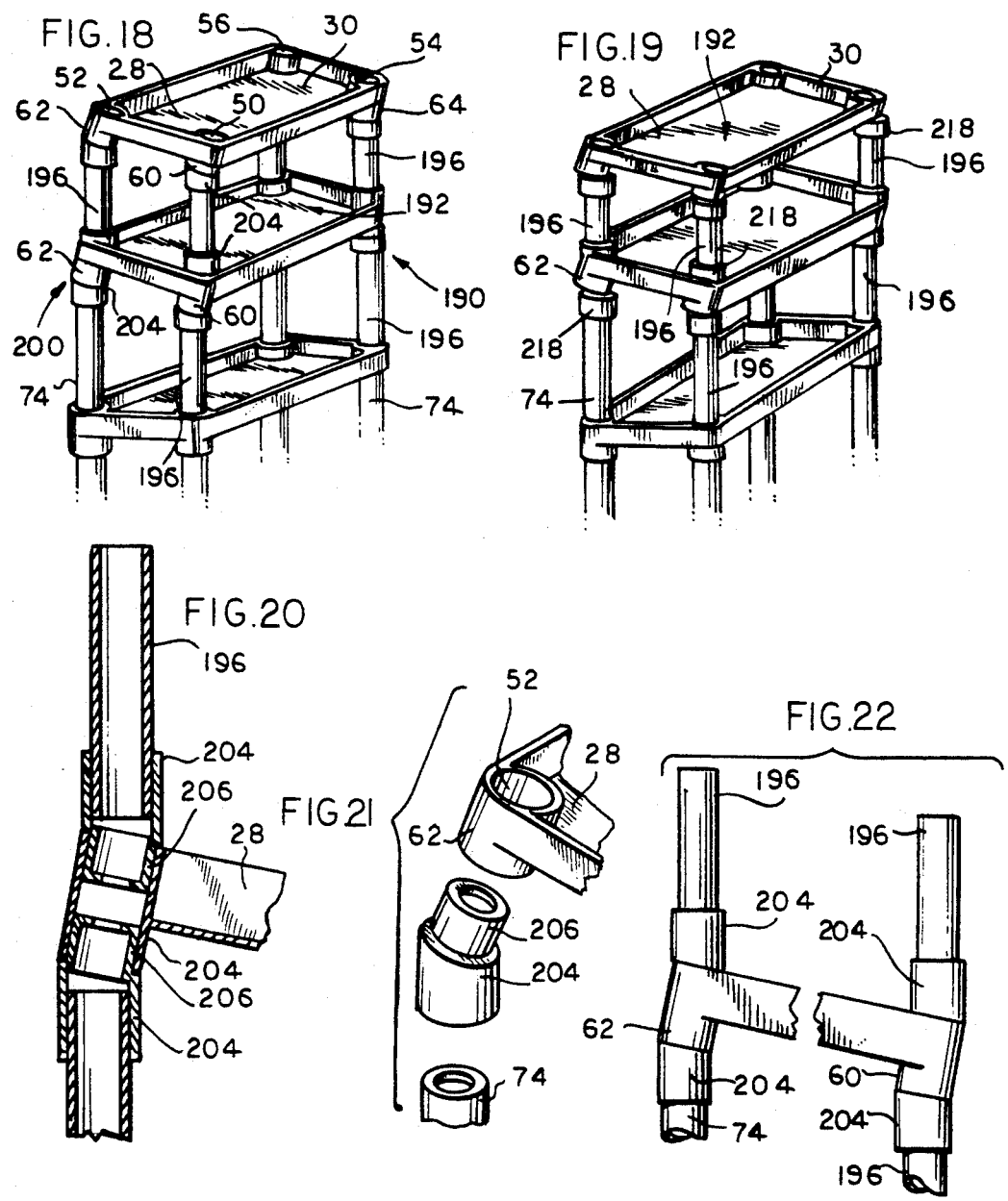
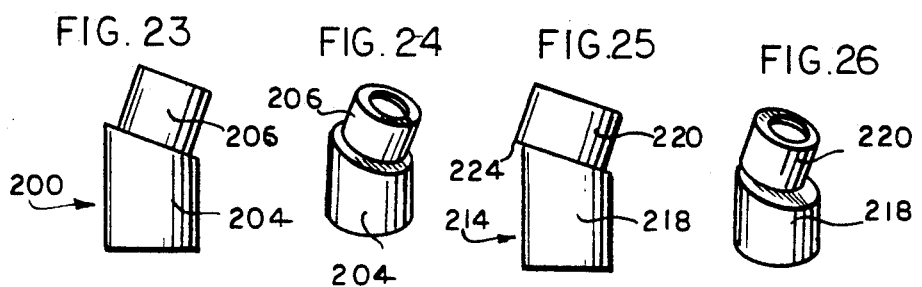

TRAY OF SHELF-LIKE STRUCTURE

FIELD OF THE INVENTION

The present invention relates to a molded plastics module for use in fabricating shelves or tray-like structures for use in displays or similar mechanical units.

More particularly, the invention is directed to a pair of molded components, each of which has the same configuration of the joinder elements integrally formed at an end wall of each component whereby the two components may be joined to provide a high-strength, weight-supporting and separation-resisting interlock establishing the end-joined panels as a coplanar, extended expanse.

Structures of molded plastics material for use as trays or shelves in display assemblies are known in the art. Such shelf-like structures have taken many and diverse physical forms and have been made using different types of molds and varying manufacturing methods and techniques. For the most part, each particular mold has been definitive in form and unvarying in dimensions. Accordingly, it has ordinarily been necessary to use a plurality of separate molds should one desire shelves having various overall dimensions or lateral expanses. It will be appreciated that as the size of the desired shelf structure increases, the cost of making the mold and the cost of the machine required to effect the molding, becomes increasingly high.

In some prior art arrangements, the problem posed has been dealt with by relying upon two separate molds, each of which produces a panel or component, the two components then being coupled in some manner so as to provide shelves or trays which are of increased lateral dimensions. The cost of designing and machining two separate molds is, again, twice that of the cost of preparing a single mold. Moreover, even when adopting the latter technique, it is necessary to fabricate still additional molds in order to obtain some degree of versatility in the overall lateral expanse of the shelf or tray being produced.

Notwithstanding the extensive research and developmental work which has been devoted toward improving the methods, techniques and apparatus for producing molded shelves of plastics material, no completely satisfactory solution to the problems has heretofore been suggested. It is, therefore, a principal aim of the present invention to provide an improved shelf module or component, and an improved molding structure by which such module may be fabricated to achieve shelf components which may be interlocked, yielding composite shelf or tray-like structures which are mechanically strong, stable, and aesthetically pleasing.

Specifically, there is herein provided molded panel or shelf components of plastics material which include integrally formed mechanical elements for coupling physically and securely with panel elements having intercoupling components to provide a two-component assembly constituting a high-strength shelf or tray in the form of an essentially unitary structure. In accordance with the practice of the present invention, the two interjoined or intercoupled components of the ultimate shelf are produced utilizing a single mold. It is a related feature of the present invention that the mold used includes selectively removable inserts so that the mold may be simply modified to produce components having different dimensions. Each of the above designated features contributes materially to realizing significant savings in mold fabrication and ensuring a high degree of versatility in the use of the molds and in producing molded components of selectable dimensions.

In one embodiment of the invention a molded, intermediate section is formed at each of its opposite ends with coupling elements for mechanical attachment to each of a pair of end panels to form a composite, unitary panel structure.

The tray-like shelves or panel assemblies of the invention may be assembled as a tiered or stacked array through the use of support tubular legs or posts. Novel adapters or fixtures facilitate supporting of the shelves in either level or in pitched modes or attitudes.

SUMMARY OF THE INVENTION

It is a principal feature of the present invention that there is provided a shelf or tray-like component or module which may be simply and readily mechanically coupled to a second molded module which has interlocking mechanical elements whose configuration is reciprocal to that of the first module, whereby the two modules which interlock to form the composite shelf or tray are conveniently fabricated using the same mold.

A related feature of the invention is that the mold itself is fabricated to include removable inserts so that the lineal dimension of the ultimate molded component may be selectively varied, while retaining the configuration of the interlocking elements of the molded structure.

Molded components of the invention are derived from modular mold apparatus including a core and cavity and selectable inserts, the latter being positionable in the cavity to provide a plurality of length and width dimensions of molded components derived from the apparatus.

It is an important feature of the interlocking components of the invention that the mechanically interlocking elements include structures which ensure proper and precise alignment of the two interjoined panels which form the shelf or tray of the final composite.

A related feature of the invention is that the interlocking elements include cooperating structures for effecting firm and positive stable interlocking interengagement to provide a high-strength, weight-supporting, and separation-resistant interlock between the components to provide a coplanar, extended expanse.

Yet another feature of the interlocking components of the invention is that each includes an end wall at a boundary of each panel, the end wall being integrally formed with a flange and with a slot so oriented and so sized that one end wall free edge of one of the interlocking components is received snugly within the slot of a second of the components to establish interlocking zones of the components with one another in each of two separate longitudinally spaced spans extending along and abutting the end walls of the components.

In a preferred embodiment of the invention, the interlocking end walls of the components to be joined are formed with cooperating protrusions and sockets extending normally of the end wall and oriented to establish an internesting of the protrusion within the recess when the components are presented to one another to form the composite assembly.

A related feature of the invention is that the protrusion, which extends normally from the end wall is formed with flange-like channels for receiving a correspondingly contoured edge structure of the wall bounding the cooperating recess, thus enhancing the interlocking securement of the two abutting panels.

It is a structural feature of the components of the invention that they are formed with a skeletal lattice-like array of walls in the form of interconnected webs extending normally of the surface of the components and operative to impart enhanced mechanical strength and rigidity to the panels.

Yet another feature of a preferred embodiment of the invention is that there are provided, in the end wall region of the panels, cooperating probes and probe-receiving apertures which function further to insure proper alignment of the panels, to preclude longitudinal separation of the panels from one another, and to enhance the stability of the assembled composite shelf or tray.

Another feature of the interlocking panels or components of the shelf of the invention is the provision of integrally formed, cooperating, vertically extending posts and channels or recesses integrally formed with the panel at opposite ends of the interconnecting walls, for effecting intercoupling engagement between abutting end walls of the cooperating panels or components.

A related feature of the invention is that the elongate vertical posts and the receiving channels are formed with cooperating grooves and webs for mating interengagement, further to stabilize the structure and to effect positive interlocking engagement between abutting components of the assembly.

In a preferred embodiment of the invention the webs or rails of the posts are tapered so as to facilitate sliding interengagement between the posts and the cooperating channels during attachment of the components to one another to form composite tray or shelf.

An important feature of the invention is that the two intercoupled or interlocked components which produce the ultimate shelf or tray need not be of the same lineal dimensions, although the two components do have the same configuration of the abutting end walls.

A related feature of the invention is that the mold used to fabricate the component elements is composed of modular sections which are selectively removable to establish molds of variable lengths and widths, each derived from the master mold and established without any need for machining of the mold or extensive mechanical modifications. The structure described enables one to fabricate shelf components of various lengths and/or widths, simply and efficiently, all from a single principal mold.

Preferred embodiments of the shelves of the invention are fabricated with integrally-formed, post-receiving tubular socket elements, so that a plurality of shelves may be stacked one above the other in a tiered array. In preferred embodiments of the invention the posts and sockets are in peripheral zones on outer margins so as to obviate interference with use of the platform areas.

In preferred embodiments of the invention, the abutting end walls are integrally formed with tapered, wedge-like projections extending vertically and spaced along the end wall to abut the end wall of an adjacent, cooperating component, thereby to establish stressed contact between the panels as said components are pivotally, manually coupled to one another to effect a unitary assembly.

A related feature of the invention is that the panels are formed on an underside thereof with post-receiving sockets, further to enhance the structural strength and stability of the arrays of stacked such shelves.

Yet another feature of the invention is that two end panels, each formed with intercoupling elements along one end of each, may be mechanically attached to a center panel at cooperating coupling elements formed at opposite end walls of the center panel.

In embodiments of the invention in which the shelves or panel assemblies are supported as a tiered array, fixtures or adapters of the invention facilitate supporting some of the shelves in a level attitude while others are supported in a pitched or slanted mode.

A related feature of the invention is the provision of adapters or fixtures with integrally-formed off-set post and shelf coupling elements making possible the support of shelves in vertical registry.

Other and further objects, features and advantages of the invention will become evident from the following detailed description considered with the drawing.

BRIEF DESCRIPTION OF THE DRAWINGS

FIG. 1 is a perspective view, showing the two-component tray or shelf, in a two-tiered stack or array;

FIG. 2 is a perspective view of a pair of identical tray components prior to effecting joinder, to make a unitary two-component shelf or tray, according to the invention;

FIG. 3 is a fragmentary, top plan view showing a corner socket of the tray component for accommodating a shelf-stacking tray-supporting post or tube;

FIG. 4 is a cross-sectional view taken substantially on the lines 4—4 of FIG. 3, and indicating schematically the manner in which the shelf-stacking tubes are used;

FIG. 5 is a fragmentary, top plan view showing the zone of juncture of two shelf components, in accordance with the invention;

FIG. 6 is an enlarged, fragmentary view, partly in section, of the area circled in FIG. 5 and showing the juncture of two shelf components at an end of the joinder wall;

FIG. 7 is an enlarged, fragmentary, elevational view of the end joinder structure, with parts cut away to show intercoupling elements, in accordance with the invention;

FIG. 8 is an enlarged, fragmentary, elevational view of the end joinder wall, showing the channel-forming bottom edge structure, the half-cylinder end wall protrusion, and the end post interlock element for intercoupling the shelf components;

FIG. 9 is an enlarged, fragmentary, top plan view of the shelf component showing the end wall protrusion, the encircling trough-like channel, the keyway, and the interlock post;

FIG. 10 is an enlarged, fragmentary, top plan view of the shelf component showing the coupling socket, the interlock key, and the post receptacle;

FIG. 11 is a fragmentary bottom plan view of the shelf component showing the interconnected strengthening ribs or web lattice;

FIG. 16 is an exploded view of a shelf assembly which consists of three end-joined panels; including a center panel element formed with identical joinder elements at each of its opposed ends;

FIG. 17 is the three panel structure of FIG. 16 in an assembled configuration to provide a unitary structure.

FIG. 18 is a perspective view of a stacked array or rack of trays or shelf assemblies of the invention in which the upper two shelves are supported in a slanted or pitched mode;

FIG. 19 is a second embodiment of the assembly depicted in FIG. 18 showing laterally offset adapters in accordance with the invention;

FIG. 20 is an enlarged, fragmentary, cross-sectional view of the angled shelf adapters of FIG. 16 and the shelf attached there-between;

FIG. 21 is an exploded view showing a lower member of the angled shelf adapters of FIG. 20, and the shelf carried thereby;

FIG. 22 is an enlarged, fragmentary view of an led shelf as supported by the post-mounted, angled adapters of the invention;

FIG. 23 is a front, elevational view of the adapter shown in FIGS. 18 and 20 through 22;

FIG. 24 is a perspective view of the adapter of FIG. 23;

FIG. 25 is a front elevational view of a laterally offset adapter as shown in FIG. 19; and FIG. 26 is a perspective view of the adapter of FIG. 25.

DETAILED DESCRIPTION OF ILLUSTRATED EMBODIMENTS

Figure 12:
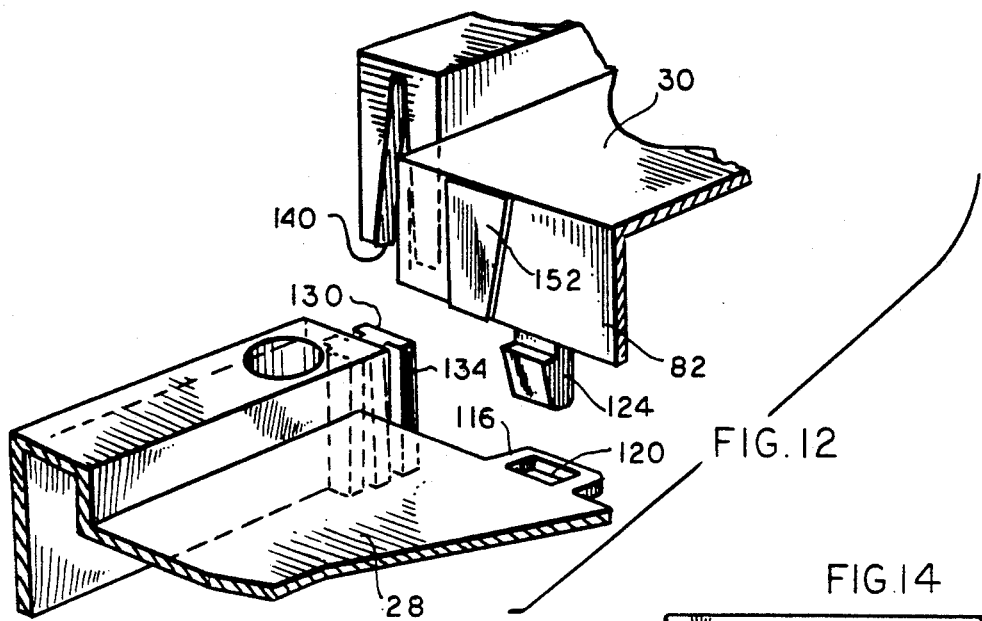
FIG. 12 is an enlarged, fragmentary, perspective exploded view indicating schematically the manner of engagement of the end post and socket and the key and key slot in accordance with the invention.
Figure 13:
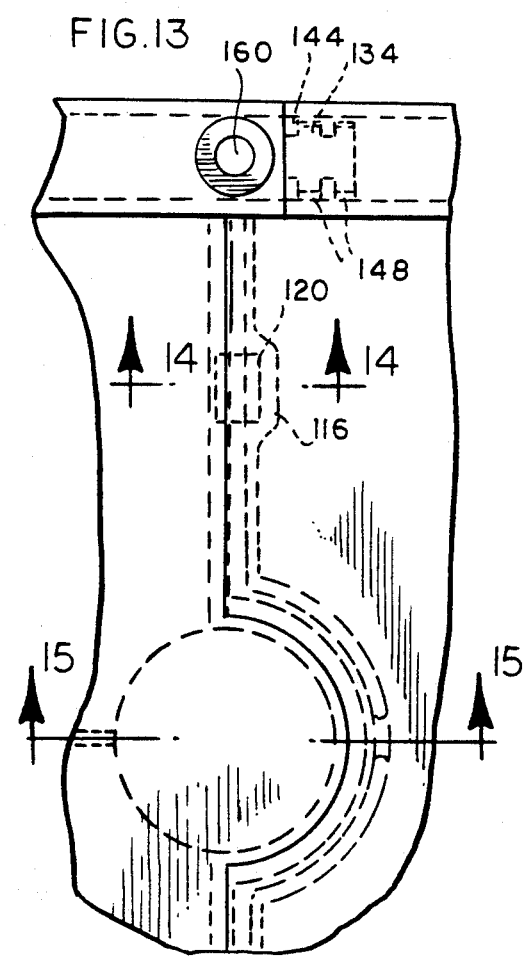
FIG. 13 is an enlarged, fragmentary, cut-away top view showing the intercoupling of two shelf components including, at the end post, the extending key and the end wall protrusion.

The aims and objects of the invention are achieved by engineering and fabricating a shelf or tray module or component which is formed with an end or joinder wall adapted to interlock positively and securely with a cooperating end wall of a second shelf component. The intercoupling is carried out by presenting the two end walls to one another at an angled attitude, and then simply rotating the two components through a limited arc until they form a continuous and substantially unitary shelf assembly of high strength and stability. In a preferred embodiment of the invention a single mold with removable sections is used so that panels or components of different lateral width and/or length may be made from the same mold to achieve ultimate shelves of selectable incremental sizes. In each final assembly, however, the joining end walls are identical for each component. The final, composite structure is characterized by remarkable physical stability and strength. In preferred embodiments of the invention it is feasible to make trays in sizes up to 24" by 24" in one piece trays, and in sizes up to 24" by 48" in two-piece trays.

In the preferred embodiment described below, the shelves or trays are integrally formed with corner-located sockets for accommodating posts which support and space two or more tray assemblies as a tiered array. The structure of the tray, interlocking end walls of the components of the tray of the invention include alignment or register-insuring elements, as well as interlocks which prevent both sliding displacement and endwise separation. In addition to intercooperating wall elements and mating troughs or channels, the interlocking elements include posts and sockets as well as keys and key slots. Other structural elements integrally formed at the facing end walls of the structures ensure the establishment of frictional forces sufficient to preclude inadvertent pivotal movement and associated separation of the joined panels or shelf components.

It will be appreciated that the present invention affords the advantages of extreme utility and versatility, to produce shelf components of various selectable sizes, and all from a single mold. In a preferred embodiment of the present invention as many as thirty-five different sizes of final shelf or tray components may be made from the same mold. In addition to its unusual strength and stability, the final shelf or tray product of the invention has an appearance which is aesthetically pleasing In the specific embodiment of the invention illustrated, each panel or segment component may, for example, be 18" in lateral width and 18" in front to rear depth. However, removable sections or inserts in the mold having a lateral width of 6", for example, may be removed so that the same mold structure will be useful to produce panels which, while still having the same front to rear depth of 18", will be only 12" in lateral width Obviously, this 12" width panel may be combined with one of identical width or with a panel having an 18" width. In the latter arrangement, the overall lateral width of the shelf produced is 30" as compared with the original 36" shelf. With the simple optional modifications described, shelves which vary in lateral width from 36" to 24", in 6" increments, may be produced. In all embodiments, the end joinder structures would remain identical, and a single mold could be used. In a similar manner, shelves of lesser depths may be produced by removing mold sections disposed to extend laterally along a mid-section of the mold, thus producing shelves which are 12" in depth rather than 18". Again all of this may be achieved from the same original mold, and the end joinder structures are such that a positive and firm mechanical interengagement is still achieved between the two end-joined panels.

Referring now to the drawings, and more particularly to FIGS. 1 and 2, for purposes of illustrative disclosure and not in any limiting sense, a preferred embodiment of the invention is shown as a tray or shelf assembly 20 consisting of two identical panels or components 24 and 26. As depicted, each component has a generally flat or planar top surface, 28 and 30, an upstanding edge wall or bounding wall 32 and 34 at the outside ends of the panels 28 and 30, the end walls being joined to front and rear walls 38 and 40, and 42 and 44, of the same cross-sectional configuration. The panels 28 and 30 are formed at their outer two corners with upwardly opening tubular sockets 50, 52; 54 and 56, the upper limits of which are flush with the top edge of the edge walls 32, 38 and 40; and 34, 42 and 44 of the panels 28 and 30. Coaxial with the upwardly opening sockets 50, 52; 54 and 56, are sockets 60, 62, 64 and 66 which open downwardly and which are separated from the upper sockets by an intermediate horizontal wall 70. As shown in FIG. 1, the sockets are for accommodating tubular sections 74 which facilitate arranging two or more shelf assemblies as a tiered or stacked array (FIG. 1).

Referring now to FIGS. 2, 5 and 8-10, each of the identical panels 28 and 30 depicted has an end wall 80 which is integrally formed with the intercoupling and interlocking elements by which the two panels are secured to one another to form the composite shown in FIGS. 1 and 5. As shown in FIGS. 2, 5 and 9, the end wall 80 is formed, adjacent one end thereof, with an arcuate or semicircular protrusion, and at an opposite end thereof with a mating, correspondingly curved recess 88 and 90. The protrusion and the recess are, in each case, spaced from a longitudinal center of the end wall 80. That portion of the expanse of the end wall 80 which includes the protrusion 82, 84 is formed with a generally U-shaped trough or channel 94, 96 which receives in mating engagement, a lower extending end 98, of the other end wall 80. In the preferred embodiment of the invention illustrated, the channel 94 includes an arcuate portion 102 at the base of the end wall protrusion 82, and the lower edge 106 of the wall 110 bounding the recess 88, seats within the channel 102 when the two components or panels 28 and 30 are brought into an interlocking disposition (FIG. 5).

Figure 14:
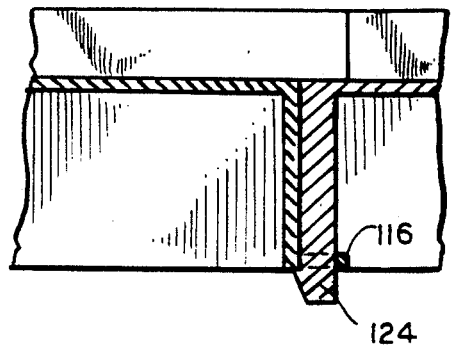
FIG. 14 is a cross-sectional view taken substantially on the lines 14—14 of FIG. 13.
Figure 15:
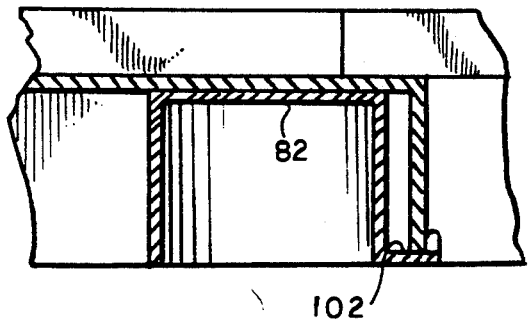
FIG. 15 is a cross-sectional view taken substantially on the lines 15—15 of FIG. 13.

Additional mechanical structures ensure a positive and firm interengagement between the joined components or panels 28 and 30. As best shown in FIGS. 9, 12 and 14, the joinder wall 80 is formed at its base with a tab 116 extending laterally of the wall 80 and having a through aperture 120 for accepting a keying probe 124. The tab 116 is adjacent one lateral end of the wall 80 while the keying probe 124 is at an opposite end of the end wall 80 he tab 116 and the keying probe 124 spaced from a longitudinal center of the end wall 80, so that, upon intercoupling and joining the panels 28 and 30, the keying probe 124 of one of the panels enters and seats within the cooperating aperture 120 of the other panel (FIGS. 12 and 14).

The structure described prevents both lateral displacement and inadvertent vertical separation of the two panels 28 and 30, once coupled.

Referring now to FIGS. 6, 7, 9, 10, 12 and 13, the joinder end wall 80 of the panels 28 and 30 is formed at one extreme end thereof with an elongate vertical post 130 formed with webs or rails 134 which are preferably tapered inwardly from a base of the rails upwardly. At its opposite end, the joinder wall 80 is formed with a channel 140 including rails 144 defining slots 148 for accommodating the post 130 and its associated webs 134. As shown in FIGS. 2, 8 and 9, the face of the end wall 80 is integrally formed with a plurality of tapered, wedge-like spacers 152. These spacers extend outwardly from the principal plane of the end wall 80 at the top thereof and taper inwardly and downwardly thereof. The spacers define zones of contact between facing end walls 80 of the respective panels or components 28 and 30 and facilitate assembly of the components as a unitary whole, since the ultimate and final contacting relationship of the combined panels is achieved only when the two components 28 and 30 are brought into a final, coplanar disposition.

As shown in FIGS. 1, 2 and 5, the panel or component is formed in each principal planar surface 28 and 30 with sockets 156 and 158 for accommodating support posts (not shown). Similar sockets 160 are formed in the bounding, or bordering raised wall of each panel.

As shown in FIG. 11, high-strength characteristics are imparted to each panel through the expedient of a lattice network of ribs or webs 170 which traverse the expanse of each panel and extend normally thereof at an undersurface of each panel The ribs or webs 170 are integrally formed with the tray structure during the molding process.

FIGS. 16 and 17 illustrate an embodiment of the invention in which an intermediate or center panel element 172 is formed at each of its opposed end walls 174 and 176 with coupling components for mating, respectively, with end wall structures of cooperating panels 24 and 26 to form a unitary, mechanically-stable 3-component shelf or similar article 178 such as shown in FIG. 17.

As indicated schematically by means of phantom lines 180 the mold in which the panels of the invention are produced is fabricated in separate sections 184, nine such sections, each six inches by six inches, being shown in the specific embodiment of the invention illustrated. In accordance with the practice of the present invention, either or both of the central rows may be optionally removed and the mold thus compacted to produce panel structures of reduced overall area; for example, 18 inches or 12 inches in depth, and 18 or 12 inches in width, thus rendering it possible to produce four different sizes of individual panels from the same basic mold structure. Irrespective of which of the particular sizes is elected, each selected panel will retain those end joinder features which constitute such an important contribution in the present invention. Each panel produced may be joined to a second panel having the same depth dimension, although the width dimension of the two panels may differ. It will be appreciated that through the present invention a high degree of versatility is achieved without concurrent associated expense.

In accordance with the practice of the present invention a given panel component may be formed at each of its two opposed transverse end walls with the joinder or connecting elements and configuration which characterize the invention. In the embodiment described, other cooperating panels may then be simple and readily connected at each of the pair of opposed joinder end walls of the first panel to provide an elongated structure which includes a unitary assembly of three panel components which are firmly and positively coupled endwise.

Referring now to FIGS. 18 through 26, in one embodiment of the invention stacked or a racked array 190 of coupled panels 28 and 30 (that is, shelves or trays) may include one or more shelf assemblies 192 of the array which are supported in a pitched, slanted, or angle mode or attitude. As shown in FIGS. 18 and 19, the desired configuration is achieved, for example, by using a pair of shortened posts or tubular sections 196 at the forwardly presented portion of the tier. In the embodiment of FIG. 18, an angled fixture or adapter 200 formed with a socket end 204 and a probe end 206 (FIGS. 23 and 24) is slideably surmounted on each of the rearward 74 and each of the shortened forward 196 posts, and the internally-formed lower sockets 60, 62, 64 and 66 of a shelf assembly 192 are superimposed to seat on the mating projections 206 of the adapters 200. (FIGS. 20 and 21).

The probe ends 206 of a second group of inverted adapters 200 are then inserted into the upwardly-opening upper sockets 50, 52, 54 and 56 of the intercoupled shelves 28 and 30 or shelf assembly 192, and a set of posts 74 or 196 of desired lengths then inserted into the upwardly-projecting sockets 204 of the adapters 200 (FIG. 22). A shelf assembly 192 (an intercoupled pair of sections 28 and 30) may then be positioned to mount on the uprights or posts (74 or 196) of selectable, pre-determined lengths with the upper ends of the posts slidingly received within and seated in the downwardly opening sockets 60, 62, 64 and 66 of the shelf assembly 192. The assembly 192 may be level. Alternatively, a second set of adapters 200 may be surmounted on the upwardly directed ends of the posts, and a second angled shelf assembly 192 mounted in place, as shown in FIG. 18. Thus, each shelf assembly 192 will assume either a level or an angled mode or attitude, as may be preferred.

Each angled shelf may be established by repeating the steps of inserting the probe ends 206 of the adapter 200 into the shelf sockets 50, 52, 54 and 56 of the shelf assembly 192, inserting posts 74 pr 196 into the adapter sockets 204, and mounting a second shelf assembly, as described above (FIG. 18).

It will be appreciated that in the rack assembly 190, assembled as described above and illustrated in FIG. 18, those segments of the rack which constitute the slanted trays or shelves 192 are displaced somewhat forwardly with respect to the perimetric bounds of a base of the array 190.

In the embodiment of the invention depicted in FIGS. 19 (and 25 and 26) all the shelf assemblies 192 including the pitched shelf 192, as well as the level 28 and 30 shelf assemblies 192 are in vertical alignment. As shown, such a configuration is achieved by means of modified couplers or adapters 214. The latter comprise structures which include socket ends 218 and probe ends 220 (FIGS. 25 and 26) which, in addition to be angled to one another, are also stepped or offset 224, laterally so that all shelf assemblies of the tier are essentially in alignment vertically. The method of assembly follows the steps outlined above.

Assembly of the two panels or components 28 and 30 to provide the extended shelf or tray is accomplished simply and expeditiously. No tools of any type are required. It is necessary merely to present the two corresponding coupling end surfaces 80 to one another at an angle of about 30° and with the arcuate protrusion 84 of each aligned for penetration into the correspondingly curved recess 110. The panels 28 and 30 are then carefully rotated with respect to one another toward assuming a coplanar configuration. During the alignment, the end posts 134 are slidingly introduced to mate within the recesses or cavity 140 of each opposite component and, at the same time, the key 124 enters into and engages the key hole 120 of each respective opposite panel or component. As the two components are brought into final planar alignment, the tapered wedges 152 engage the opposed end wall sections and a firm and positive assembly results, with no objectionable play or instability. It will be appreciated that at the final closure and alignment, the lower end edge of one of the panels enters into to seat within the channel 94 and 102 of the second panel. Thus the interengagement of the two components is maximized and enhanced overall. Separation of the two components is achieved by simply reversing the procedure described above.

While the invention has been described with reference to a preferred embodiment, it will be appreciated by those skilled in the art that changes and substitutions in apparatus and precise parameters of operation may be made without departing from the spirit and scope of the invention as defined in the appended claims.

What is claimed is:

1. A component defining a panel of an assembly of a plastic composition for shelf panel and tray uses and having a principal surface for supporting articles thereon, said assembly comprising a pair of molded panel components having a reciprocal configuration of joinder elements, each of said components having a transversely extending end wall at a boundary of said panel;

said end wall being integrally formed with connector means for effecting firm and positive engagement with a joinder end wall of a second of said components to provide a high-strength, weight-supporting, and separation-resisting interlock juncture therebetween and establishing end-joined corresponding panels of said components as a coplanar extended structural expanse;

connector means including flange means integral with said end wall and extending along a longitudinal edge thereof to define therewith trough-like slot means opening toward an opposite edge of said end wall;

each said end wall having a free edge portion directed downwardly and extending along a lower margin of said end wall;

said slot means being oriented and sized snugly to receive therewithin said free edge of said end wall of a second of said components in engagement therewithin, thereby to establish structurally corresponding interlocking zones of said components with one another in each of two separate longitudinally spaced spans extending along coextensive and abutting said end walls of said components.

2. The structure as set forth in claim 1 wherein said end wall is formed at a locus within a first longitudinal expanse thereof with protrusion means projecting generally normally of said end wall;

and wherein said end wall is formed with recess means at a locus within a second longitudinal expanse of said end wall;

said protrusion means and said recess means being spaced from a longitudinal center of horizontally extending said end wall;

said protrusion means comprising means carried by one of said components for penetratingly invading said recess means of a second of said components, and said recess means comprising means formed in one of said components for receiving said protrusion means of a second of said components;

thereby to establish intersecting of said protrusion means within said recess means when said components are presented to one another along each corresponding said end wall thereof for interconnecting said components along said end wall to form a composite assembly.

3. The structure as set forth in claim 2 and further comprising channel means integrally formed with said protrusion means at a base thereof for receiving therewithin in sleeved engagement therewith a lower marginal edge of a wall bounding said recess means.

4. The structure as set forth in claim 1 and further comprising a skeletal, lattice-like array of interconnected web means integrally formed with and depending from an underside of said principal surface for imparting mechanical strength and rigidity to said components.

5. The structure as set forth in claim 1 and further comprising tab means integral with and extending normally of said end wall at a lower end thereof;

said tab means being formed with a through aperture defining keyway means for receiving a keying probe therethrough;

and further comprising probe means integrally formed with and extending downwardly of said end wall at a lower edge thereof for penetration into and for keying engagement within said keyway means of the tab means;

said probe means and said keyway means being spaced from a longitudinal center of said end wall whereby upon presentation of said components to one another for intercoupling engagement, said probe means of one of said components enters into said keying means of a second of said components further to ensure proper alignment and to enhance stability of the resulting said assembly.

6. The structure as set forth in claim 1 and further comprising elongate, vertical post means integrally formed with each of said components adjacent one end wall of each and displaced outwardly from said end wall and generally paralleling said end wall;

and wherein said end wall of each of said components is formed at an end thereof opposite said post means with vertically disposed recess means offset inwardly of said end wall for matingly receiving said post means of said end wall of an opposed one of said components to effect interengagement between said post means and said recess means of said components of said assembly.

7. The structure as set forth in claim 6 wherein said post means includes rails extending longitudinally therealong, and further comprising spaced elongate ribs invading said recess means along a length thereof;

said ribs defining therebetween groove means for receiving said rails of said post means in sliding engagement therewithin during attachment of said components to one another.

8. The structure as set forth in claim 7 wherein said rails are tapered inwardly along their length from a base of said end wall upwardly toward a top thereof, and wherein said ribs in said recess means are oppositely tapered.

9. The structure as set forth in claim 8 and further comprising web means for spacing said rails and integrally formed therewith, said web means being tapered in general conformity with the taper of said rails.

10. The assembly as set forth in claim 1 wherein said molded components comprise modules which are different in length.

11. The structure as set forth in claim 1 and further comprising means integrally formed with said components for accommodating leg means for facilitating stacking of coupled said components to form a tiered, vertical array.

12. The structure as set forth in claim 1 and further comprising spacer means integrally formed on said end wall of each said component and defining a plurality of tapered wedge-like projections extending vertically and distributed along said end wall to abut an end wall of an adjacent one of said components to establish a stressed contact therebetween as said components are pivotally manually coupled to one another to take up longitudinal slack and to effect a unitary assembly.

13. The structure as set forth in claim 1 wherein said end joined panels of said components are panels which differ in a length dimension as measured longitudinally of said component.

14. The structure as set forth in claim 1 wherein each said component is a composite of a plurality of a real sections forming an expanse of said components.

15. The structure as set forth in claim 1 wherein said expanse defined by said panel components is essentially devoid of ridges and presents a continuous, uninterrupted surface configuration.

16. The structure as set forth in claim 11, wherein said means for accommodating leg means are located in marginal zones of said components so as to avoid interference with unimpaired use of said expanse of said principal surface.

17. The structure as set forth in claim 1 wherein one of said panel components is formed at each of a pair of opposed end walls thereof with connector means for effecting firm and positive engagement with joinder elements of each of a pair of cooperating panel components at joinder end walls thereof to provide an assembly having three lineally connected panel-forming components.

18. The structure as set forth in claim 11 and further comprising fixture means for interdisposition between and coupling with said shelf components and with said leg means for supporting said shelf components in a pitched mode.

19. The structure as set forth in claim 18 wherein said means for coupling with said leg means comprise socket means opening vertically of a principal surface of said shelf components, and wherein said fixture means comprises plug means for insertion into to seat within said socket means of said components, and open-ended sleeve means for matingly receiving end means of said leg means therewithin, and wherein said plug means and said sleeve means of said fixture means have longitudinally extending axes which intersect at an obtuse angle.

20. The structure as set forth in claim 19 wherein said plug means and said sleeve means of said adapter are offset laterally with respect to one another.

21. In the method of fabricating a component for an assembly comprising molded components for providing a shelf-like structure, each of said component having the same configuration of joinder elements for interconnecting adjacently presented said components to provide a high-strength, weight-supporting and separation-resisting interlock juncture therebetween, and establishing end-joined said components as a unitary shelf-like structure, and including the steps of:

providing a mold defining a mold cavity for introduction of a molding material thereinto, and loading said mold under functional pressure and temperature conditions to produce a molded product;

the improvement comprising arranging said mold to accommodate a plurality of sections including a principal section for defining and generating the joinder elements and adjacently positioned body sections for producing the remainder of the component, and selectively removing a body section to provide mold cavity of a reduced areal expanse.

22. Molded components derived from modular mold apparatus including a core and cavity, and selectable inserts, the inserts being positionable in the cavity to provide a plurality of length and width dimensions of molded components derived from the apparatus, and further comprising web element means for interjoining modules of said molded components.

23. In an assembly of a plastics composition for shelf panel and for tray uses, said assembly including a component having a principal surface for supporting articles said assembly comprising a pair of molded panel components, each component including a transversely extending end wall at a boundary thereof, panel joinder means of the same configuration formed in each said end wall, said panel joinder means including integrally molded connector means for effecting firm and positive engagement with an end wall of an abutting second component of said pair of components to provide a high-strength, weight-supporting, and separation-resisting interlock juncture therebetween, said junction establishing end-joined cooperating said panel components as a physically-interconnected, coplanar, extended, structural, shelf-like expanse.

24. A component defining a panel of an assembly of a plastic composition for shelf panel and tray uses and having a principal surface for supporting articles thereon, said assembly comprising a pair of molded panel components having a reciprocal configuration of joinder elements, each of said components having a transversely extending end wall at a boundary of said panel;

said end wall being integrally formed with connector means for effecting firm and positive engagement with a joinder end wall of a second of said components to provide a high-strength, weight-supporting, and separation-resisting interlock juncture therebetween and establishing end-joined corresponding panels of said components as a coplanar extended structural expanse;

said end wall being formed at a locus within a first longitudinal expanse thereof with protrusion means projecting generally normally of said end wall;

said end wall being formed with recess means at a locus within a second longitudinal expanse of said end wall;

said protrusion means and said recess means being spaced from a longitudinal center of horizontally extending said end wall;

said protrusion means comprising means carried by one of said components for penetratingly invading said recess means of a second of said components, and said recess means comprising means formed in one of said components for receiving said protrusion means of a second of said components;

thereby to establish internesting of said protrusion means within said recess means when said components are presented to one another along each corresponding said end wall thereof for interconnecting said components along said end wall to form a composite assembly.

25. The structure as set forth in claim 24 and further comprising channel means integrally formed with said protrusion means at a base thereof for receiving therewithin in sleeved engagement therewith a lower marginal edge of a wall bounding said recess means.

26. The structure as set forth in claim 24 and further comprising a skeletal, lattice-like array of interconnected web means integrally formed with and depending from an underside of said principal surface for imparting mechanical strength and rigidity to said components.

27. The structure as set forth in claim 24 and further comprising tab means integral with and extending normally of said end wall at a lower end thereof;

said tab means being formed with a through aperture defining keyway means for receiving a keying probe therethrough;

and further comprising probe means integrally formed with and extending downwardly of said end wall at a lower edge thereof for penetration into and for keying engagement within said keyway means of the tab means;

said probe means and said keyway means being spaced from a longitudinal center of said end wall whereby upon presentation of said components to one another for intercoupling engagement, said probe means of one of said components enters into said keying means of a second of said components further to ensure proper alignment and to enhance stability of the resulting said assembly.

28. The structure as set forth in claim 24 and further comprising elongate, vertical post means integrally formed with each of said components adjacent one end wall of each and displaced outwardly from said end wall and generally paralleling said end wall;

and wherein said end wall of each of said components is formed at an end thereof opposite said post means with vertically disposed recess means offset inwardly of said end wall for matingly receiving said post means of said end wall of an opposed one of said components to effect interengagement between said post means and said recess means of said components of said assembly.

29. The structure as set forth in claim 28 wherein said post means includes rails extending longitudinally therealong, and further comprising spaced elongate ribs invading said recess means along a length thereof;

said ribs defining therebetween groove means for receiving said rails of said post means in sliding engagement therewithin during attachment of said components to one another.

30. The structure as set forth in claim 29 wherein said rails are tapered inwardly along their length from a base of said end wall upwardly toward a top thereof, and wherein said ribs in said recess means are oppositely tapered.

31. The structure as set forth in claim 30 and further comprising web means for spacing said rails and integrally formed therewith, said web means being tapered in general conformity with the taper of said rails.

32. The structure as set forth in claim 24 wherein said molded components comprise modules which are different in length.

33. The structure as set forth in claim 24 and further comprising means integrally formed with said components for accommodating leg means for facilitating stacking of coupled said components to form a tiered, vertical array.

34. The structure as set forth in claim 24 and further comprising spacer means integrally formed on said end wall of each said component and defining a plurality of tapered wedge-like projections extending vertically and distributed along said end wall to abut an end wall of an adjacent one of said components to establish a stressed contact therebetween as said components are pivotally manually coupled to one another to take up longitudinal slack and to effect a unitary assembly.

35. The structure as set forth in claim 24 wherein said end joined panels of said components are panels which differ in a length dimension as measured longitudinally of said component.

36. The structure as set forth in claim 24 wherein each said component is a composite of a plurality of areal sections forming an expanse of said components.

37. The structure as set forth in claim 24 wherein said expanse defined by said panel components is essentially devoid of ridges and presents a continuous, uninterrupted surface configuration.

38. The structure as set forth in claim 33 wherein said means for accommodating leg means are located in marginal zone of said components so as to avoid interference with unimpaired use of said expanse of said principal surface.

39. The structure as set forth in claim 24 wherein one of said panel components is formed at each of a pair of opposed end walls thereof with connector means for effecting firm and positive engagement with joinder elements of each of a pair of cooperating panel components at joiner end walls thereof to provide an assembly having three lineally connected panel-forming components.

40. The structure as set forth in claim 33 and further comprising fixture means for interdisposition between and coupling with said shelf components and with said leg means for supporting said shelf components in a pitched mode.

41. The structure as set forth in claim 40 wherein said means for coupling with said leg means comprise socket means opening vertically of a principal surface of said shelf components, and wherein said fixture means comprises plug means for insertion into to seat within said socket means of said components, and open-ended sleeve means for matingly receiving end means of said leg means therewithin, and wherein said plug means and said sleeve means of said fixture means have longitudinally extending axes which intersect at an obtuse angle.

42. The structure as set forth in claim 41 wherein said plug means and said sleeve means of said adapter are offset laterally with respect to one another.

43. A component defining a panel of an assembly of a plastic composition for shelf panel and tray uses and having a principal surface for supporting articles thereon,
    said assembly comprising a pair of molded panel components having a reciprocal configuration of joinder elements, each of said components having a transversely extending end wall at a boundary of said panel;
    said end wall being integrally formed with connector means for effecting firm and positive engagement with a joinder end wall of a second of said components to provide a high-strength, weight-supporting, and separation-resisting interlock juncture therebetween and establishing end-joined corresponding panels of said components as a coplanar extended structural expanse; and
    means integrally formed with said components for accommodating leg means for facilitating stacking of coupled said components to form a tiered, vertical array.

44. A component defining a panel of an assembly of a plastic composition for shelf panel and tray uses and having a principal surface for supporting articles thereon,
    said assembly comprising a pair of molded panel components having a reciprocal configuration of joinder elements, each of said components having a transversely extending end wall at a boundary of said panel;
    said end wall being integrally formed with connector means for effecting firm and positive engagement with a joinder end wall of a second of said components to provide a high-strength, weight-supporting, and separation-resisting interlock juncture therebetween and establishing end-joined corresponding panels of said components as a coplanar extended structural expanse; and
    spacer means integrally formed on said end wall of said component and defining a plurality of tapered wedge-like projections extending vertically and distributed along said end wall to abut an end wall of an adjacent one of said components to establish a stressed contact therebetween as said components are pivotally manually coupled to one another to take up longitudinal slack and to effect a unitary assembly.

45. A component defining a panel of an assembly of a plastic composition for shelf panel and tray uses and having a principal surface for supporting articles thereon,
    said assembly comprising a pair of molded panel components having a reciprocal configuration of joinder elements, each of said components having a transversely extending end wall at a boundary of said panel;
    said end wall being integrally formed with connector means including vertically interlocking coupling means for effecting firm and positive engagement with a joinder end wall of a second of said components to provide a high-strength, weight-supporting, and separation-resisting interlock juncture therebetween precluding longitudinal separation of adjacent said panel components and establishing end-joined corresponding panels of said components as a coplanar extended structural expanse.

* * * * *